United States Patent Office 2,879,490
Patented Mar. 24, 1959

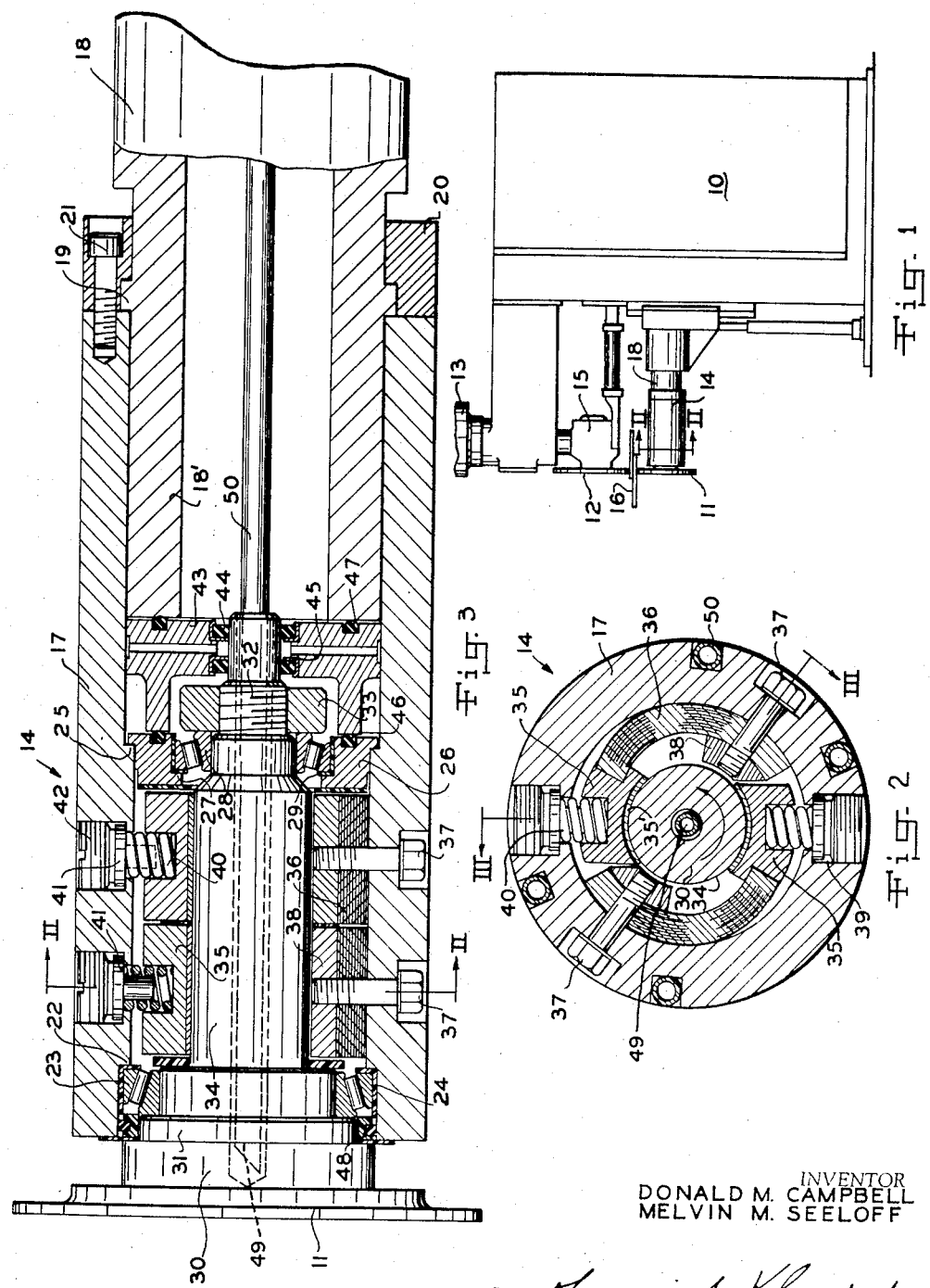
March 24, 1959    D. M. CAMPBELL ET AL    2,879,490
ROTARY CURRENT TRANSFER DEVICE
Filed July 21, 1954
INVENTOR
DONALD M. CAMPBELL
MELVIN M. SEELOFF
BY *Francis J. Klempay*
ATTORNEY

2,879,490

ROTARY CURRENT TRANSFER DEVICE

Donald M. Campbell and Melvin M. Seeloff, Warren, Ohio, assignors to The Taylor-Winfield Corporation, Warren, Ohio, a corporation of Ohio Application July 21, 1954, Serial No. 444,816

5 Claims. (Cl. 339—5)

The present invention relates to equipment for electric resistance welding apparatus and the like, and more particularly to an improved and simplified device for transferring heavy electric currents from stationary to rotating parts.

As a general object, the present invention seeks to provide a rotary current transfer device adapted for the handling of heavy resistance welding currents, for example, which is of a highly compact nature, having a simplified overall structure, while being wholly adequate for the intended purpose.

More specifically, it is an object of the present invention to provide an improved rotary current transfer device having special application in the electric resistance welding art, for example, which is generally of the type having anti-friction load supporting bearings and current contact means acting wholly independently of such load supporting bearings wherein the complete structure may be assembled in a compact cylindrical housing which may be attached to a cylindrical electrode support of a resistance welding machine, as an axial extension thereof. Apparatus of this general nature finds particular usefulness in electric resistance seam welding, for example, wherein overlapped workpieces are passed between rotary electrode wheels.

Yet another object of the invention is the provision of a rotary current transfer device for heavy duty operation which is characterized by a novel arrangement for transferring current from a stationary conductor to a rotating spindle or electrode member which is simple and self-adjusting, involving a practical minimum of accurate machining and fitting of parts. In this respect it will be understood that a rotating electrode spindle may be subject to deflection during operation due to the mechanical forces applied thereto, and, of course, the spindle is subject to wear through prolonged use, so that the current transfer parts must be continuously self-adjusting to compensate for such conditions. The present invention affords a wholly satisfactory arrangement for this purpose while being primarily characterized by its utter simplicity, in notable contrast to similar apparatus heretofore available for the same purpose.

A further object of our invention is the provision of a rotary current transfer device of the type and having the characteristics set forth above which may be economically manufactured and serviced, and which is adapted for long periods of maintenance-free operation.

The above and other objects and advantages of the invention will become apparent upon full consideration of the following detailed specification and accompanying drawing wherein is shown a preferred embodiment of our invention.

In the drawing:

Figure 1 is a side elevation of a representative electric resistance welding machine having roller electrodes and embodying the improved rotary current transfer device of our invention;

Figure 2 is an enlarged section view of our improved device, the section being taken substantially along lines II—II of Figures 1 and 3; and Figure 3 is a longitudinal section view of our improved device taken along line III—III of Figure 2.

Referring now to the drawing, the reference numeral 10 designates a conventional welding machine having a lower electrode wheel 11 which is jouraled in generally fixed relation to the machine as a whole, and an upper electrode wheel 12 which is mounted for vertical movement toward and away from the lower electrode 11, a suitable actuator 13 being provided for this purpose. Welding current is supplied to the electrodes 11 and 12 through rotary current transfer devices 14 and 15 respectively so that overlapped workpieces 16, passing between the electrodes 11 and 12, may be heated and fused together in the manner desired. In the illustrated apparatus the lower current transfer device 14 is of the type embodying the teachings of our present invention, while the upper transfer device 15 may be of the type disclosed and claimed in U.S. Patent No. 2,673,333, to Melvin M. Seeloff and Joseph H. Cooper.

Referring now to Figures 2 and 3, the improved current transfer device of our invention comprises an elongated cylindrical casing or housing 17 of copper or other highly conductive material which serves to house the operative parts of the transfer device as well as to secure the device as a whole to an axially extending electrode support 18 which is also of current conductive material and which is rigidly secured to the frame of the welding machine 10.

As shown in Figure 3, the electrode support 18 is provided with an outer end portion 18' of reduced diameter, with an annular shoulder 19 being located adjacent the inner or right hand end of the reduced portion. The housing 17 is received snugly over the reduced end portion 18' and is positioned so that the inner end of the housing abuts against the shoulder 19. The arrangement is such that there is ample contacting area between the housing 17 and support 18, to provide for the passage therebetween of welding currents, and at the same time substantial mechanical support is afforded by the telescoped relation of the parts 17 and 18.

To secure the housing 17 in its described position there is provided a split collar 20 having circumferentially spaced bores therein for the reception of bolts 21, the latter being received and secured in suitably tapped bores in the cylindrical housing 17.

At the forward end of the housing 17 there is provided an internal shoulder 22 against which is seated a tapered roller bearing 23, suitable insulating material 24 being interposed to isolate the bearing 23 electrically from the housing 17. Spaced inwardly of the shoulder 22 is an oppositely disposed internal shoulder 25, against which is seated an adapter collar 26 having an internal shoulder 27 of reduced diameter. Seated against the last mentioned shoulder 27 is a second tapered roller bearing 28, a layer or insulation 29 being employed to isolate the bearing 28 from the collar 26 in accordance with conventional practice.

Journaled in the spaced anti-friction bearings 23 and 28 is a current conductive electrode supporting spindle 30. The spindle 30 is provided with an enlarged flange or shoulder 31 at its forward end which engages with the inner race of the forward bearing 23, and adjacent the inner end of the spindle there is provided a threaded portion 32 which receives a nut 33 for engaging the inner race of the second bearing 28. The arrangement is such that the spindle 30 may be rigidly and accurately locked in position with respect to the casing 17, while being freely rotatable therein.

Between the bearings 23 and 28 there is provided an even diametered contact portion 34 of the spindle 30 which is adapted to have moving contact with a plurality of current conductive brushes 35. In accordance with the teachings of the invention the brushes 35 have attached at one side thereof a laminated flexible conductor 36 which extends circumferentially about the spindle 30 within the annular space between the spindle 30 and the housing 17 therefor. In the illustrated and preferred embodiment of the invention there are provided two side-by-side pairs of current conductive brushes 35 which are positioned diametrically opposite to each other, each being provided with a circumferentially disposed laminated conductor 36 which extends from the brush to which it is attached substantially to the diametrically opposed brush. Thus, as shown in Figure 2 the conductors 36 extend circumferentially over an arc in the order of 120 degrees, the end of each conductor being anchored at this point to the wall of the cylindrical housing 17 by means of bolts 37 which extend through the side wall of the housing 17 and which engage arcuately contoured anchor nuts 38 whereby the conductors 37 are tightly compressed against the inner side wall of the housing 17, in good electrical contact therewith.

Opposite each of the brushes 35, in the housing 17, there is provided a threaded and shouldered opening 39 in which is received, in the order stated, a compressible coil spring 40, a flanged fiber member 41 and a threaded retaining screw 42. The springs 40 are received in suitable recesses provided in the brushes 35 and act against the fiber members 41 and retaining screws 42 and against the brushes 35 to urge the latter into pressure contact with the spindle 30. Thus, there are provided a plurality of low resistance current paths leading from the current conductive casing or housing 17, through flexible conductors 36 and brushes 35 to the electrode supporting spindle 30.

In most cases it is desirable to provide the contact surface of the brushes 35 with a facing 35' of silver, for example, to improve transfer and other characteristics, or the brushes 35 may be formed of solid blocks of silver, if desired.

Preferably the bearings and moving contacts of our device are maintained in a bath of lubricant, such as castor oil, for example, and to this end we provide a a sealing cap 43 which is received within the housing or casing 17, in fluid-tight relation with the collar 26, spindle 30 and supporting arm 18. Suitable sealing rings and gaskets 44—47 are incorporated into the assembly to properly isolate the lubricated chamber. Additional sealing means 48 are also provided at the forward end of the housing 17 for the same purpose.

Cooling of the spindle 30 and related components is accomplished in the conventional manner by extending a water conduit 49 through the center of the spindle. And further conduits 50 may be brazed or otherwise positioned in heat exchange relation to the housing 17 where necessary or desirable.

It should thus be apparent that we have fulfilled the objects initially set forth. Our improved current transfer device is substantially more simplified and compact than equivalent apparatus of heretofore known designs. Of primary significance is our "wrap-around" arrangement of the current conducting brushes 35 and flexible conductors 36 whereby the number of moving or movable contacts is reduced, while at the same time the overall assembly is substantially as compact as possible, other considerations being taken into account. Thus, whereas in most prior devices of which we are aware current is transferred from a stationary housing to the electrode supporting spindle through members which have sliding contact with the spindle and sliding or at least movable contact with the housing. Maintenance problems are of course greater in such cases, and electrical characteristics are less favorable than in our design where a permanent or non-movable contact is had with the housing.

As clearly illustrated in Figure 3 the current transfer device of our invention may be assembled into a simple compact unitary cylindrical housing which is telescopically received over the main supporting arm of the welding apparatus, substantially as an axial extension thereof, affording good electrical contact and a rigid mechanical interconnection.

It should be understood, however, that the preferred embodiment of our invention herein illustrated is intended to be representative only, as many changes may be made therein within the clear teachings of the disclosure. Reference should therefore be had to the following appended claims in determining the full scope of the invention.

We claim:

1. In a rotary electrode welding machine having a device for transferring high amperage welding currents between stationary and rotary parts, said device being of the type having a rotary spindle, a housing, spaced anti-friction bearings mounted in said housing and supporting said spindle, and means to transfer high amperage welding current between said housing and spindle; the improvement in said means to transfer comprising a plurality of movable brush contact members positioned within said housing and in contact with said spindle, resilient means in said housing directly opposite said contact members to urge the same toward said spindle, and thick laminated flexible conductors of appreciable cross section connecting said contact members and anchored in electrically conducting relation to said housing, said flexible conductors extending arcuately circumferentially about said spindle in encircling relation therewith to said contact members.

2. Apparatus according to claim 1 further including anchor blocks for anchoring said flexible conductors to said housing, each of said blocks being positioned closely adjacent a contact member and on the side thereof opposite the flexible conductor leading to such contact member for limiting circumferential movement of said contact member upon rotation of said spindle in the direction of circumferential extension of said conductor.

3. Apparatus according to claim 1 further including a forwardly extending electrode supporting arm, and further characterized by said housing comprising a cylindrical member having a rearwardly extending portion for telescopic connection to, as an axial extension of, said supporting arm.

4. In a rotary electrode welding machine having a device for transferring high amperage welding currents between stationary and rotary parts, said device being of the type having a rotary spindle, a housing, spaced anti-friction bearings mounted in said housing and supporting said spindle, and means to transfer high amperage welding current between said housing and said spindle; the improvement in said means to transfer comprising a plurality of brush contact members positioned within said housing and in contact with said spindle, thick laminated flexible conductors of appreciable cross section connecting said contact members and anchored in electrically conducting relation to said housing, said flexible conductors extending arcuately and circumferentially about said spindle in encircling relation therewith to said contact members, resilient means in said housing directly opposite said contact members for urging the same toward said spindle said housing being cylindrical and of such size with respect to said spindle to provide an annular clearance between said spindle and the inner wall of said housing which is of not substantially greater thickness than said brush contact members, and said flexible conductors being secured to said contact members at the side edges thereof.

5. In a rotary electrode welding machine having a device for transferring high amperage welding currents between stationary and rotary parts, said device being of the type having a rotary spindle, a housing, spaced anti-friction bearings mounted in said housing and supporting said spindle, and means to transfer high amperage welding current between said housing and said spindle; the improvement in said means to transfer comprising a plurality of movable brush members positioned within said housing and in contact with said spindle, thick laminated flexible conductors of appreciable cross section connecting said contact members and anchored in electrically conducting relation to said housing, said flexible conductors extending arcuately and circumferentially around said spindle in encircling relation therewith to said contact members, said contact members each having a recess in its outer surface, and coil springs received in said recesses and acting against said housing to urge said contact members in a radial direction against said spindle.

References Cited in the file of this patent

UNITED STATES PATENTS

| | | |
|---|---|---|
| 1,802,957 | Ragsdale et al. | Apr. 28, 1931 |
| 2,291,070 | Bruno | July 28, 1942 |
| 2,498,346 | Smith | Feb. 21, 1950 |
| 2,636,066 | Sciaky | Apr. 21, 1953 |
| 2,726,371 | Seeloff | Dec. 6, 1955 |